United States Patent [19]

Maley et al.

[11] Patent Number: 5,488,340
[45] Date of Patent: Jan. 30, 1996

[54] HARD MAGNETIC VALVE ACTUATOR ADAPTED FOR A FUEL INJECTOR

[75] Inventors: Dale C. Maley, Fairbury; Dwayne E. Tharp, Peoria, both of Ill.

[73] Assignee: Caterpillar Inc., Peoria, Ill.

[21] Appl. No.: 247,150

[22] Filed: May 20, 1994

[51] Int. Cl.$^6$ ........................................... H01F 7/08
[52] U.S. Cl. .................. 335/253; 335/266; 335/279; 335/281
[58] Field of Search ......................... 335/220–282, 335/279, 281, 253, 254; 310/15–35; 251/129.01–129.22; 239/585.1–585.5

[56] References Cited

U.S. PATENT DOCUMENTS

| | | | |
|---|---|---|---|
| 2,144,862 | 1/1939 | Truxell, Jr. | 239/88 |
| 2,421,329 | 5/1947 | Hoffer | 210/166 |
| 2,434,586 | 1/1948 | Reynolds | 31/58 |
| 2,512,557 | 6/1950 | Weldy | 239/453 |
| 2,535,937 | 12/1950 | Bozec et al. | 239/533.12 X |
| 2,552,445 | 5/1951 | Nielsen | 239/436 |
| 2,597,952 | 5/1952 | Rosenlund | 137/139 |
| 2,621,011 | 12/1952 | Smith | 251/27 |
| 2,672,827 | 3/1954 | McGowen, Jr. | 103/232 |
| 2,727,498 | 12/1955 | Reiners | 123/32 |
| 2,749,181 | 6/1956 | Maxwell et al. | 239/584 |
| 2,916,048 | 12/1959 | Gunkel | 137/544 |
| 3,035,780 | 5/1962 | Peras | 239/453 |
| 3,057,560 | 10/1962 | Campbell | 239/464 |
| 3,071,714 | 1/1963 | Hadekel | 317/172 |
| 3,175,771 | 3/1965 | Bréting | 239/533 |
| 3,410,519 | 11/1968 | Evans | 251/141 |
| 3,532,121 | 10/1970 | Sturman et al. | 137/625.4 |
| 3,570,806 | 3/1971 | Sturman et al. | 251/65 |
| 3,570,807 | 3/1971 | Sturman et al. | 251/65 |

(List continued on next page.)

FOREIGN PATENT DOCUMENTS

| | | |
|---|---|---|
| 0425236A1 | 5/1991 | European Pat. Off. . |
| 0246373B1 | 3/1992 | European Pat. Off. . |
| 981664 | 12/1982 | U.S.S.R. . |

OTHER PUBLICATIONS

Frankl, et al., "Electronic Unit Injectors–Revised," *SAE Technical Series*, 40th Annual Earthmoving Industry Conference, Peoria, Ill., (Apr. 11–13, 1989).

Roters, "Electromagnetic Devices", First Edition, pp. 44–45, 67, 70.

"Excerpts from Sep. 6, 1992 memorandum authored by Dale Maley".

Sturman, "Breakthrough in Digital Valves," *Machine Design*, vol. 66, No. 4, dated Feb. 21, 1994, pp. 37–42.

Primary Examiner—Leo P. Picard
Assistant Examiner—Raymond M. Barrera
Attorney, Agent, or Firm—Marshall, O'Toole, Gerstein, Murray & Borun

[57] ABSTRACT

A solenoid actuator, adapted for use in a fuel injector, has a pole member, an armature associated therewith, and an energizable winding associated with the pole member. The solenoid actuator is latchable by residual magnetism between the pole member and the armature without the aid of a permanent magnet. The pole member and the armature are composed of steel having a carbon content of between 0.8% and 1.2% and an RC hardness of between 40 and 60. The armature is reciprocable between a first position in which the armature makes physical contact with the pole member and a second position in which the armature is spaced from the pole member. The armature occupies the first position when the winding is energized and the second position when the winding is deenergized. The armature is held in the first position by residual magnetism between the pole member and the armature when the winding is deenergized after being initially energized. The actuator may also be embodied in the form of a dual-acting actuator having an armature and first and second pole members. The armature and pole member(s) of the actuator may be formed via a heat treating method which is based on the recognition of the relationship between the hardness of the pole member(s) and armature and the resultant residual magnetism of those components.

22 Claims, 3 Drawing Sheets

U.S. PATENT DOCUMENTS

| | | | |
|---|---|---|---|
| 3,570,833 | 3/1971 | Sturman et al. | 267/161 |
| 3,574,690 | 4/1971 | Kettering et al. | 335/279 |
| 3,585,547 | 6/1971 | Sturman | 335/227 |
| 3,604,959 | 9/1971 | Sturman et al. | 310/12 |
| 3,675,853 | 7/1972 | Lapera | 239/464 |
| 3,683,239 | 8/1972 | Sturman | 317/150 |
| 3,743,898 | 7/1973 | Sturman | 317/154 |
| 3,753,547 | 8/1973 | Topham | 251/120 |
| 3,814,376 | 6/1974 | Reinicke | 251/65 |
| 3,821,967 | 7/1974 | Sturman et al. | 137/624.15 |
| 3,835,829 | 9/1974 | Links | 123/139 E |
| 3,858,135 | 12/1974 | Gray | 335/266 |
| 3,989,066 | 11/1976 | Sturman et al. | 137/624.2 |
| 4,087,736 | 5/1978 | Mori et al. | 322/28 |
| 4,087,773 | 5/1978 | Jencks et al. | 335/243 |
| 4,107,546 | 8/1978 | Sturman et al. | 307/141 |
| 4,108,419 | 8/1978 | Sturman et al. | 251/30 |
| 4,114,647 | 9/1978 | Sturman et al. | 137/624.2 |
| 4,114,648 | 9/1978 | Nakajima et al. | 137/625.5 |
| 4,120,456 | 10/1978 | Kimura et al. | 239/464 |
| 4,152,676 | 5/1979 | Morgenthaler et al. | 333/24.1 |
| 4,189,816 | 2/1980 | Chalansonnet | 29/148.4 |
| 4,192,466 | 3/1980 | Tanasawa et al. | 239/464 |
| 4,231,525 | 11/1980 | Palma | 239/585 |
| 4,248,270 | 2/1981 | Ostrowski | 138/45 |
| 4,266,727 | 5/1981 | Happel et al. | 239/409 |
| 4,273,291 | 6/1981 | Müller | 239/533.12 |
| 4,275,693 | 6/1981 | Leckie | 123/447 |
| 4,308,891 | 1/1982 | Loup | 137/551 |
| 4,354,662 | 10/1982 | Thompson | 251/129 |
| 4,375,274 | 3/1983 | Thoma et al. | 239/117 |
| 4,392,612 | 7/1983 | Deckard et al. | 239/88 |
| 4,396,037 | 8/1983 | Wilcox | 137/625.65 |
| 4,409,638 | 10/1983 | Sturman et al. | 361/152 |
| 4,482,094 | 11/1984 | Knape | 239/88 |
| 4,501,290 | 2/1985 | Sturman et al. | 137/495 |
| 4,516,600 | 5/1985 | Sturman et al. | 137/495 |
| 4,518,147 | 5/1985 | Andresen et al. | 251/121 |
| 4,526,519 | 7/1985 | Mowbray et al. | 417/490 |
| 4,541,454 | 9/1985 | Sturman et al. | 137/505.41 |
| 4,558,844 | 12/1985 | Donahue, Jr. | 251/118 |
| 4,610,428 | 9/1986 | Fox | 251/129.16 |
| 4,648,559 | 3/1987 | Fuller | 239/585 |
| 4,653,455 | 3/1987 | Eblen et al. | 123/506 |
| 4,658,824 | 4/1987 | Scheibe | 123/472 |
| 4,702,212 | 10/1987 | Best et al. | 123/472 |
| 4,721,253 | 1/1988 | Noguchi et al. | 239/464 |
| 4,753,416 | 6/1988 | Inagaki et al. | 251/129.15 |
| 4,794,890 | 1/1989 | Richeson, Jr. | 123/90.11 |
| 4,811,221 | 3/9189 | Sturman et al. | 364/420 |
| 4,812,884 | 3/1989 | Mohler | 335/258 |
| 4,813,599 | 3/1989 | Greiner et al. | 239/456 |
| 4,831,989 | 5/1989 | Haines | 123/506 |
| 4,846,440 | 7/1989 | Carlson et al. | 251/129.15 |
| 4,875,499 | 10/1989 | Fox | 137/82 |
| 4,893,102 | 1/1990 | Bauer | 335/132 |
| 4,893,652 | 1/1990 | Nogle et al. | 137/596.17 |
| 4,928,887 | 5/1990 | Miettaux | 239/584 |
| 4,964,571 | 10/1990 | Taue et al. | 239/88 |
| 4,993,637 | 2/1991 | Kanesaka | 239/96 |
| 5,004,577 | 4/1991 | Ward | 264/112 |
| 5,042,445 | 8/1991 | Peters et al. | 123/446 |
| 5,049,971 | 9/1991 | Krumm | 357/55 |
| 5,050,543 | 9/1991 | Kawamura | 123/90.11 |
| 5,110,087 | 5/1992 | Studtmann et al. | 251/129.16 |
| 5,121,730 | 6/1992 | Ausman et al. | 123/467 |
| 5,131,624 | 7/1992 | Kreuter et al. | 251/129.18 |
| 5,156,341 | 10/1992 | Terakado et al. | 239/585.4 |
| 5,161,779 | 11/1992 | Graner et al. | 251/129.16 |
| 5,188,336 | 2/1993 | Graner et al. | 251/129.16 |
| 5,339,777 | 8/1994 | Cannon | 123/90.12 |

5,488,340

HARD MAGNETIC VALVE ACTUATOR ADAPTED FOR A FUEL INJECTOR

TECHNICAL FIELD

The present invention is directed to a solenoid actuator, for use in applications requiring a relatively large number of actuations, in which the armature of the solenoid actuator makes contact with the pole member of the actuator and a method of making a pole member and armature for a solenoid actuator.

BACKGROUND ART

Solenoid actuators are in widespread use in many applications, such as for actuating valves. A conventional, single-acting solenoid actuator typically has a pole member, a wire coil provided in the pole member, a linearly translatable armature associated with the pole member, and a spring for biasing the armature away from the pole member. When electric current is provided to the wire coil, a magnetic field is produced which overcomes the force of the bias spring to draw the armature towards the pole member. When the electric current is switched off, the magnetic force dissipates, and the bias spring urges the armature away from the pole member. When the armature of the solenoid actuator is connected to the stem of a valve element, the operation of the solenoid controls whether the valve is opened or closed.

A non-latching type solenoid is one that requires an electric current to be provided to the wire coil in order to maintain the armature in a position adjacent the pole member, referred to herein as the "actuated position." In applications which require the armature to be in the actuated position for long periods of time, a non-latching solenoid actuator requires a relatively large amount of energy to operate and is therefore inefficient.

To overcome the above problem of high energy consumption, a conventional latching solenoid actuator may be used. Such a solenoid actuator does not require electric current to be provided to the wire coil at all times in order to maintain the armature in the actuated position.

One conventional type of latching solenoid actuator relies upon the magnetic attraction between the pole member and the armature caused by residual magnetism in those two elements after the electric current to the wire coil is switched off. In that type of actuator, to move the armature from its non-actuated position to its actuated position, the electric current is turned on until the armature makes contact with the pole member, at which point it is turned off, and the armature remains in its actuated position due to residual magnetism, which applies a holding force greater than the opposing force of the bias spring. To move the armature to its non-actuated position, electric current is temporarily provided in the opposite direction in the wire coil to cancel or oppose the residual magnetism, which allows the bias spring to move the armature to its non-actuated position. To achieve the necessary residual magnetism for operation, the pole member and the actuator are typically composed of soft magnetic materials, such as pure iron and/or 3% silicon iron.

Although a latching actuator of the type described above is advantageous in that it conserves electrical power, it is not suitable for applications which require numerous actuations of the solenoid actuator because the magnetic materials from which the pole member and armature are composed are relatively soft. As a result, the repeated contact between the pole member and armature results in mechanical wear on those two components, causing the amount of linear displacement of the solenoid actuator to gradually change over time. Such actuators are not acceptable for applications, such as fuel injection systems, requiring precise linear movements over an extended period of time. The mechanical wear of the armature and pole member may also generate small metallic particles which would contaminate the solenoid actuator and hinder its operation.

The wear problem described above usually cannot be overcome by providing a mechanical stop to prevent the armature from making contact with the pole member, resulting in a small air gap between the pole member and the armature when the armature is in the actuated position. This approach is not acceptable since the provision of the air gap usually weakens the residual magnetism enough so that it is insufficient to hold the armature in its actuated position after the electric current in the wire coil is turned off.

One manner in which the wear problem may be overcome is by providing an air gap between the pole member and the armature when the armature is in the actuated position and, instead of using residual magnetism to latch the armature, incorporating one or more permanent magnets in the pole member to hold the armature in its actuated position. However, the use of permanent magnets in solenoid actuators has drawbacks because permanent magnet materials are relatively expensive and because their magnetic characteristics change with temperature, thus rendering them unsuitable for some applications in which substantial temperature changes occur.

U.S. Pat. No. 3,743,898 to Sturman discloses various embodiments of a latching solenoid actuator which utilize residual magnetism to hold the actuator in the actuated position. Sturman indicates that the magnetic components of the actuator may be formed of various materials, such as C1010 and C1020 low carbon steel.

U.S. Pat. No. 4,114,648 to Nakajima, et al. discloses a double-acting electromagnetic valve in which a movable magnetic member 17 within the magnetic cores 1, 2 of the valve is latched in the two actuated positions by residual magnetism. Nakajima, et al. indicate that the magnetic cores 1, 2 may be composed of a magnetic material having a high residual magnetism such as magnet steel or heat-tempered, high carbon steel, such as S50C carbon steel after being subjected to a heat tempering process. The movable magnetic member 17 may be made of a magnetic material having a low residual magnetism or a high residual magnetism.

U.S. Pat. No. 4,231,525 to Palma discloses an electromagnetic fuel injector with a selectively hardened armature. The fuel injector includes a valve that may be made of any suitable hard material, either a magnetic material or a non-magnetic material. For durability, the valve may be made of suitably hardened SAE 51440 stainless steel. The armature is made of a magnetically soft material, such as SAE 1002–1010 steel. To prevent the armature from wearing during extended usage, Palma indicates that selected surfaces of the armature should be case hardened. In particular, the armature surfaces which should be hardened are those surfaces that are not within the magnetic circuit, but which are subject to wear during extended usage. The manner in which the armature surfaces are selectively case hardened is relatively complicated.

DISCLOSURE OF THE INVENTION

In one aspect, the present invention is directed to a solenoid actuator having a pole member, an armature associated therewith, and an electrically energizable electromagnetic device associated with the pole member. The solenoid actuator is latchable by residual magnetism between the pole member and the armature without the aid of a permanent magnet. The pole member and the armature are composed of steel having a carbon content of between about 0.8% and 1.2% and a Rockwell C (RC) hardness of between about 40 and 60. The armature is reciprocable between a first position in which the armature makes physical contact with the pole member and a second position in which the armature is spaced from the pole member. The armature occupies the first position when the electromagnetic device is energized and the second position when the electromagnetic device is deenergized. The armature is held in the first position by residual magnetism between the pole member and the armature when the electromagnetic device is deenergized after being initially energized. Preferably, the armature and pole member are composed substantially of SAE 52100 steel.

The invention may also be embodied in the form of a dual-acting solenoid actuator having an armature and first and second pole members composed of steel having a carbon content of between about 0.8% and 1.2% and an RC hardness of between about 40 and 60 and first and second energizable windings associated with the first and second pole members. In this embodiment, the armature is reciprocable between a first position in which the armature makes physical contact with the first pole member and a second position in which the armature makes physical contact with the second pole member. The armature occupies the first position when the first electromagnetic device is energized and the second position when the second electromagnetic device is energized. The armature is held in the first position by residual magnetism between the first pole member and the armature when the first electromagnetic device is deenergized after being initially energized, and the armature is held in the second position by residual magnetism between the second pole member and the armature when the second electromagnetic device is deenergized after being initially energized.

The solenoid actuator may be provided as part of an electronic control valve in a fuel injector having a fuel injector body, a fuel inlet formed in the fuel injector body, pump means disposed in the fuel injector body and being supplied with fuel from the fuel inlet, and a nozzle valve disposed in the fuel injector body and being provided fuel from the pump means. The nozzle valve may occupy an open position when the fuel provided by the pump means is above a threshold fuel pressure and a closed position when the fuel provided by the pump means is below a threshold fuel pressure.

In another aspect, the invention is directed to a method of manufacturing a pole member and an armature for a latching-type solenoid actuator having a selected latching force. The method, which is based on the recognition of the relationship between the hardness of the pole member and armature and the resultant residual magnetism that may be induced in those components, includes the steps of forming the pole member and armature out of steel; selecting a latching force for the solenoid actuator; determining what the hardness of the pole member and actuator should be based on the selected latching force; and heat treating the pole member and the armature to achieve that hardness.

The step of heat treating the pole member and the armature may include the steps of heating the pole member and the armature to a first temperature; cooling the pole member and the armature; heating the pole member and the armature to a second temperature lower than the first temperature; and cooling the pole member and the armature.

The features and advantages of the present invention will be apparent to those of ordinary skill in the art in view of the detailed description of the preferred embodiment, which is made with reference to the drawings, a brief description of which is provided below.

BEST MODE FOR CARRYING OUT THE INVENTION

Figure 1:
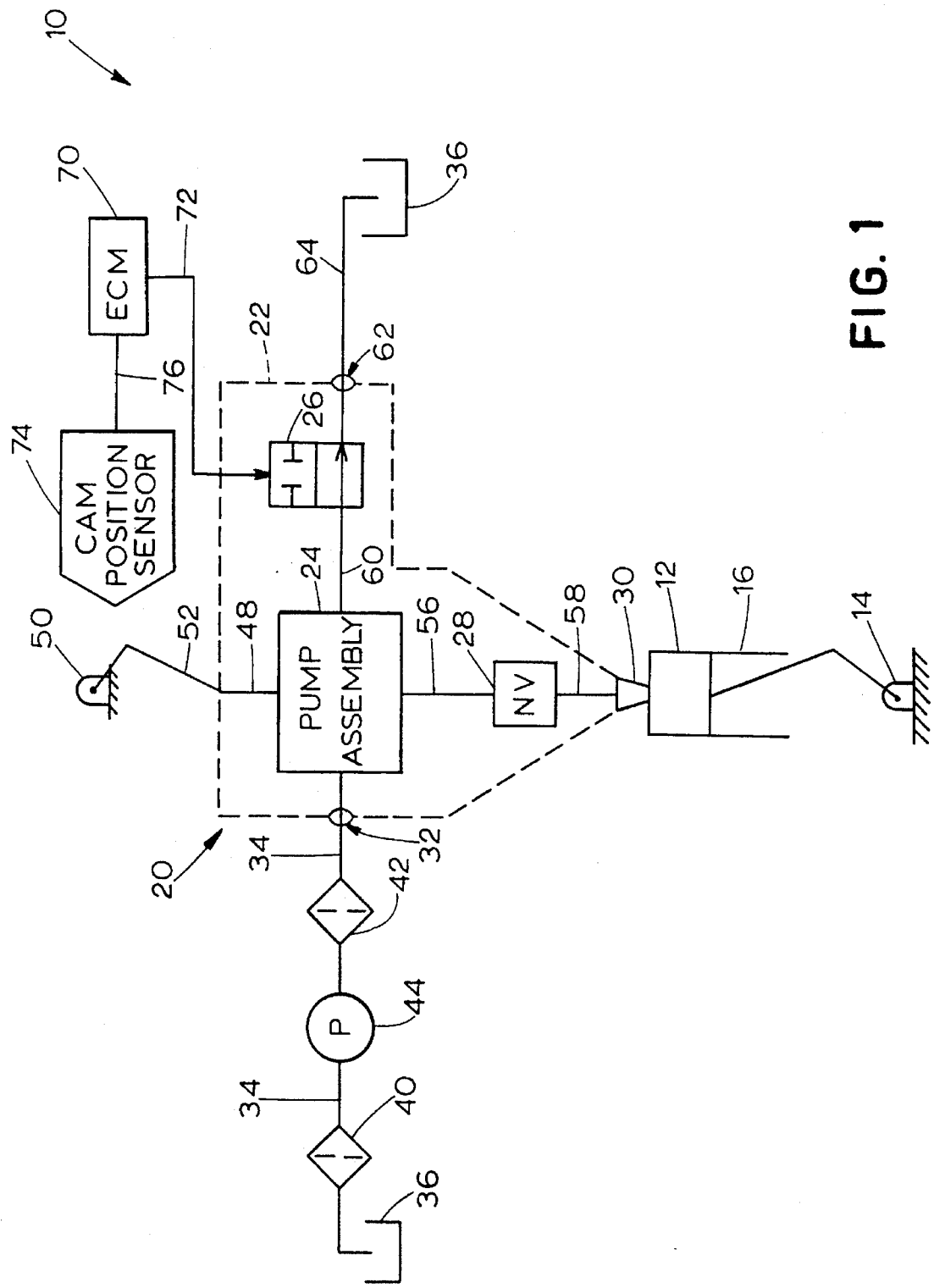
FIG. 1 is a schematic diagram illustrating a mechanically-actuated electronically-controlled unit injector fuel system having a fuel injector with an electronic control valve in accordance with the invention.

One embodiment of a mechanically-actuated electronically-controlled unit injector ("MEUI") fuel system 10 is illustrated in FIG. 1. The fuel injection system 10 is adapted for a diesel-cycle, direct-injection internal combustion engine having a number of engine pistons 12, one of which is shown attached to an engine crank 14 and disposed for reciprocating movement in an engine cylinder 16.

Fuel is injected into the cylinder 16 by a fuel injector 20 having a fuel injector body schematically designated by dotted lines 22, a pump assembly 24, an electronic control valve 26, a nozzle valve 28, and a nozzle tip 30. Pressurized fuel is supplied to the pump assembly 24 through a fuel inlet 32 fluidly connected to a fuel passageway or line 34, which is in turn fluidly connected to a fuel tank or reservoir 36. A pair of fuel filters 40, 42 are provided in the fuel line 34, and the fuel is pressurized to a relatively low pressure, such as 410 kPa (60 psi) by a transfer pump 44.

The relatively low pressure fuel supplied to the pump assembly 24 via the fuel passageway 34 is periodically pressurized to a relatively high injection pressure, such as 210,000 kPa (30,000 psi), by a plunger 48 which is mechanically connected to an engine cam 50 via a rocker arm 52. The nozzle valve 28 is fluidly connected to the pump assembly 24 via a fuel passageway 56 and is fluidly connected to the nozzle tip 30 via a fuel passageway 58. The nozzle valve 28 operates as a check valve which opens when the fuel provided to it by the pump assembly 24 reaches a relatively high threshold pressure, such as 34,200 kPa (5,000 psi), and closes when the fuel pressure falls below the threshold pressure.

The fuel pressurization provided by the pump assembly 24 is controlled by the control valve 26, which is fluidly connected to the pump assembly 24 via a fuel passageway 60. When the control valve 26 is in its open position, as shown in FIG. 1, fuel may exit the pump assembly 24 via the passageway 60, through a fuel outlet 62 formed in the fuel injector body 22, and through a fuel passageway or line 64 which drains into the fuel reservoir 36, thus preventing the fuel within the pump assembly 24 from being pressurized to the injection pressure by the plunger 48. When the control valve 26 is closed, fuel may not exit the pump assembly 24 via the fuel passageway 60, and thus the fuel may be pressurized by the plunger 48.

The opening and closing of the control valve 26 is controlled by an engine control module ("ECM") 70 connected to it by an electrical line 72. The engine control module 70 is connected to a cam-position sensor 74 which senses the position of the cam 50 and generates a cam-position signal on a line 76 connected to the engine control module 70. In response to the cam-position signal, the engine control module 70 generates electrical power on the line 72 to periodically open and close the control valve 26, which is solenoid-actuated, to cause fuel to be periodically injected into the cylinder 16.

The operation of the fuel injection system 10 is described below in connection with one injection cycle. To begin fuel injection, the control valve 26 is moved from its open position, as shown in FIG. 1, to its closed position, which prevents fuel from exiting the pump assembly 24 via the fuel passageway 60. After the control valve 26 is closed, the rocker arm 52 drives the plunger 48 downwards, which increases the pressure of the fuel within the pump assembly 24 and the pressure of the fuel provided to the nozzle valve 28. When the fuel pressure in the nozzle valve 28 reaches the relatively high threshold pressure, the nozzle valve 28 opens and fuel is injected from the nozzle 30 into the cylinder 16.

When fuel injection is to be ended, the control valve 26 is moved from its closed position to its open position. As a result, pressurized fuel exits the pump assembly 24 through the fuel passageways 60, 62, causing the fuel pressure in the pump assembly 24 and in the nozzle valve 28 to decrease. When the fuel pressure in the nozzle valve 28 falls below the threshold pressure, the nozzle valve 28 closes, thus terminating the injection of fuel into the cylinder 16.

Figure 2:
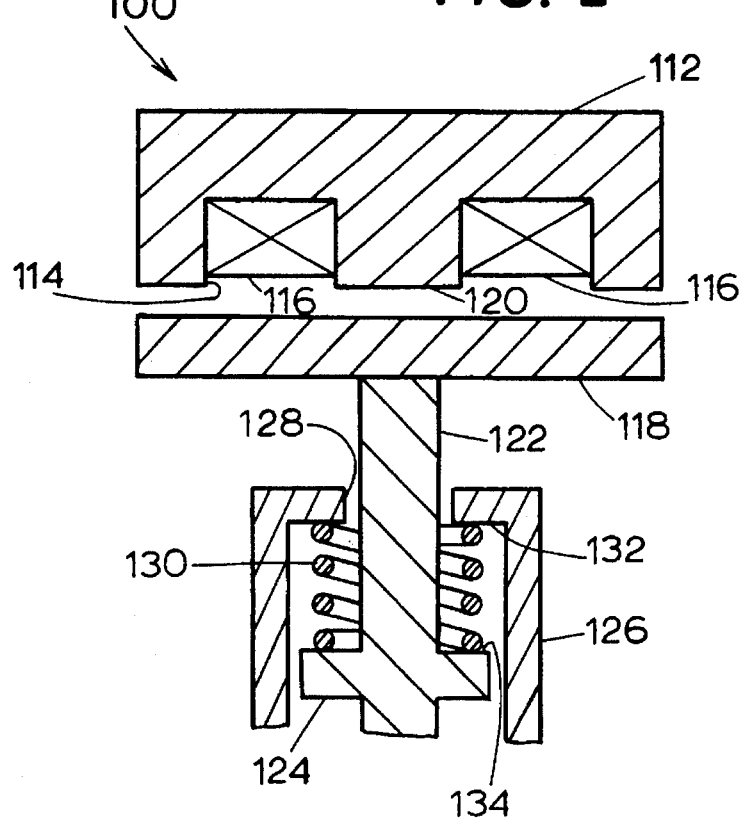
FIG. 2 is a cross-sectional view of one embodiment of an actuator for the electronic control valve of FIG. 1.

A cross-section of a first embodiment of a solenoid actuator 100 for actuating the control valve 26 is illustrated in FIG. 2. The actuator 100 includes a generally cylindrical pole member 112 with an annular recess 114 formed therein. An electromagnetic device, such as an energizable winding or wire coil 116, is disposed within the recess 114. A generally flat, cylindrical armature 118 is shown spaced apart from the bottom face 120 of the pole member 112. The armature 118 is supported by a rod 122 which may be connected to it by any conventional means, such as a bolt (not shown). The rod 122 has an annular extension or disk 124 integrally formed with it. A generally cylindrical housing member 126 has a bore 128 through which the rod 122 passes. The housing member 126 encloses a portion of the rod 122, the disk 124, and a spring 130 disposed between a lower face 132 of the housing member 126 and the upper face 134 of the disk 124 to bias the armature 118 away from the lower face 120 of the pole member 112.

The pole member 112 and the armature 118 are both formed of steel having a carbon content between about 0.8% and 1.2% and having a Rockwell C ("RC") hardness between about 40 and 60. The magnetic properties of the steel, which determine the amount of residual magnetism that may be induced, are determined primarily by the carbon content of the steel. Preferably, the carbon content of the steel is about 1.0%, and SAE (Society of Automotive Engineers) 52100 steel having an RC hardness of about 59 has been found preferable. SAE 52100, which is a conventional steel used for bearing applications, is steel having the following constituents, by weight percent, expressed either as a range of permissible percentages or a maximum allowable percentage:

| | |
|---|---|
| Carbon | 0.98–1.10% |
| Manganese | 0.25–0.45% |
| Phosphorous$_{max}$ | 0.025% |
| Sulfur$_{max}$ | 0.025% |
| Silicon | 0.15–0.30% |
| Chromium | 1.30–1.60% |

SAE 52100 steel may also have trace amounts of the following constituents:

| | |
|---|---|
| Copper$_{max}$ | 0.35% |
| Nickel$_{max}$ | 0.25% |
| Molybdenum$_{max}$ | 0.08% |

As described in more detail below, a suitable RC hardness may be achieved by heat treating or otherwise hardening the pole member 112 and the armature 118.

When the operative components of the solenoid actuator 100 of FIG. 2 are incorporated into a structure to be controlled, such as the control valve 26 of FIG. 1, the pole member 112 and the housing 126 would be stationary with respect to each other, and the armature 118 and rod 122 would reciprocate up and down in the vertical direction.

In operation, the actuator 100 has two states or positions, a first or actuated position in which the armature 118 is in physical contact with the lower face 120 of the pole member 112, and a second or non-actuated position in which the armature 118 is spaced from the lower face 120 of the pole member 112.

To actuate the solenoid 100, the wire coil 116 is energized by passing electric current through it in a direction to attract the armature 118 towards the pole member 112. When the attractive force overcomes counterforce of the bias spring 130, the armature 118 moves upward and makes contact with the lower surface 120 of the pole member 112. After such contact is made, the electric current in the wire coil 116 may be shut off, and, despite the counterforce generated by the bias spring 130, the armature 118 will remain latched in contact with the lower face 120 of the pole member 112 due to residual magnetism.

To deactuate the solenoid 100, electric current is generated in the wire coil 116 in the opposite direction (opposite the direction required to actuate the solenoid) for a relatively brief period of time to overcome the residual magnetism holding the armature 118 in contact with the lower face 120 of the pole member 112. Preferably, once the armature 118 begins to move away from the lower face 120, electric current is shut off to the wire coil 116. After the residual magnetism is overcome, the armature 118 is pulled away from the pole member 112 by the bias spring 130.

The use of the specific steels described above is advantageous in that such steels have sufficient magnetic properties to allow the solenoid actuator 100 to be latched by residual magnetism and that they are sufficiently hard so that the pole member 112 and the armature 118 are not deformed or unduly worn despite repeated contact between those two components, which is particularly advantageous in applications requiring the solenoid to be actuated frequently, resulting in a relatively high number of actuations over the life of the actuator.

Figure 3:
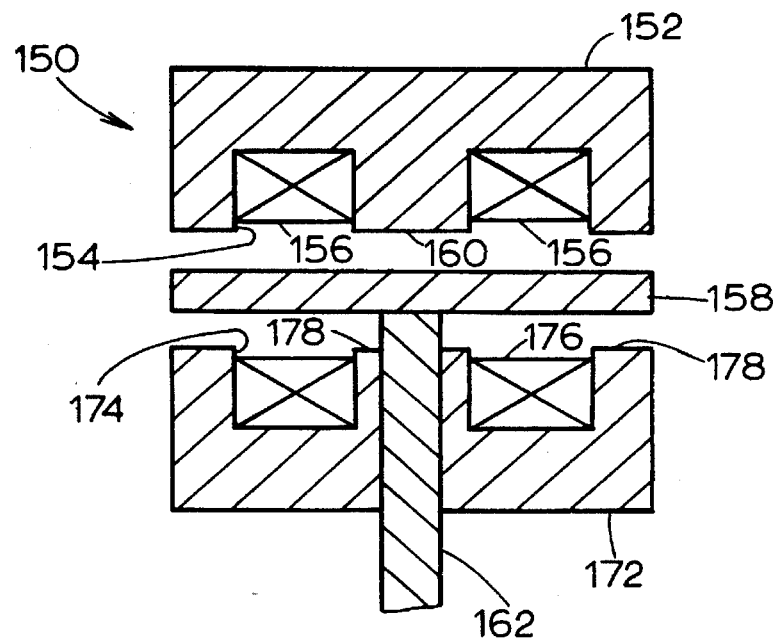
FIG. 3 is a cross-sectional view of a second embodiment of an actuator for the electronic control valve of FIG. 1.

A cross-section of a second embodiment of a solenoid actuator 150 for actuating the control valve 26 is illustrated in FIG. 3. The actuator 150 includes a generally cylindrical upper pole member 152 with an annular recess 154 formed therein. A first electromagnetic device, such as an energizable winding or wire coil 156, is disposed within the recess 154. A generally flat, cylindrical armature 158 is shown spaced apart from the bottom face 160 of the pole member 152. The armature 158 is supported by a rod 162 which may be connected to it by any conventional means.

The solenoid actuator 150 has a generally cylindrical lower pole member 172 with an annular recess 174 formed therein. A second electromagnetic device, such as winding or wire coil 176 is disposed within the recess 174. The lower pole member 172 also has an upper face 178 and a central bore through which the rod 162 passes.

The pole members 152, 172 and the armature 158 are both formed of steel having a carbon content between about 0.8% and 1.0% and having an RC hardness between about 40 and 60. Preferably, the carbon content of the steel is about 1.0%, and SAE 52100 steel having an RC hardness of about 59 has been found suitable.

In operation, the actuator 150 has two states or positions, a first actuated position in which the armature 158 is in physical contact with the lower face 160 of the upper pole member 152, and a second actuated position in which the armature 158 is in physical contact with the upper face 178 of the lower pole member 172.

One manner of energizing the wire coils 156, 176 to reciprocate the armature 158, and thus to open and close the control valve 26, is described below. Other energization methods could be used, and the particular energization method is not considered important to the present invention.

To actuate the solenoid 150 to occupy its first actuated position (from a non-actuated position in which the solenoid is not latched), the wire coil 156 is electrically energized by passing electric current through it in a direction to attract the armature 158 towards the upper pole member 152. When the armature 158 makes contact with the lower surface 160 of the upper pole member 152, the current in the wire coil 156 is shut off, and the armature 158 will remain latched in contact with the lower face 160 of the upper pole member 152 due to residual magnetism.

To actuate the solenoid 150 to occupy its second actuated position (from its first actuated position), the wire coil 176 is electrically energized by passing electrical current through it in a direction to attract the armature 158 towards the upper surface 178 of the lower pole member 172. When the armature 158 makes contact with the surface 178, the electrical current in the wire coil 176 is shut off, and the armature 158 will remain magnetically latched in contact with the surface 178 due to residual magnetism. At approximately the same time that the wire coil 176 is energized, electric current may optionally be generated in the wire coil 156 in the opposite direction (opposite the direction required to move the armature 158 towards the surface 160) for a relatively brief period of time, such as less than one millisecond, to overcome the residual magnetism latching or holding the armature 158 in contact with the surface 160.

The solenoid actuator components formed of the preferred steel are subject to a heat treating process to achieve a desired, precise latching force. There is a relationship between the hardness of the preferred steel and the magnetic characteristics of the steel. As the hardness of the preferred steel increases, the magnetic characteristics change so that the amount of residual magnetism which can be induced in the steel increases. As a result, the latching force also increases.

Figure 4:
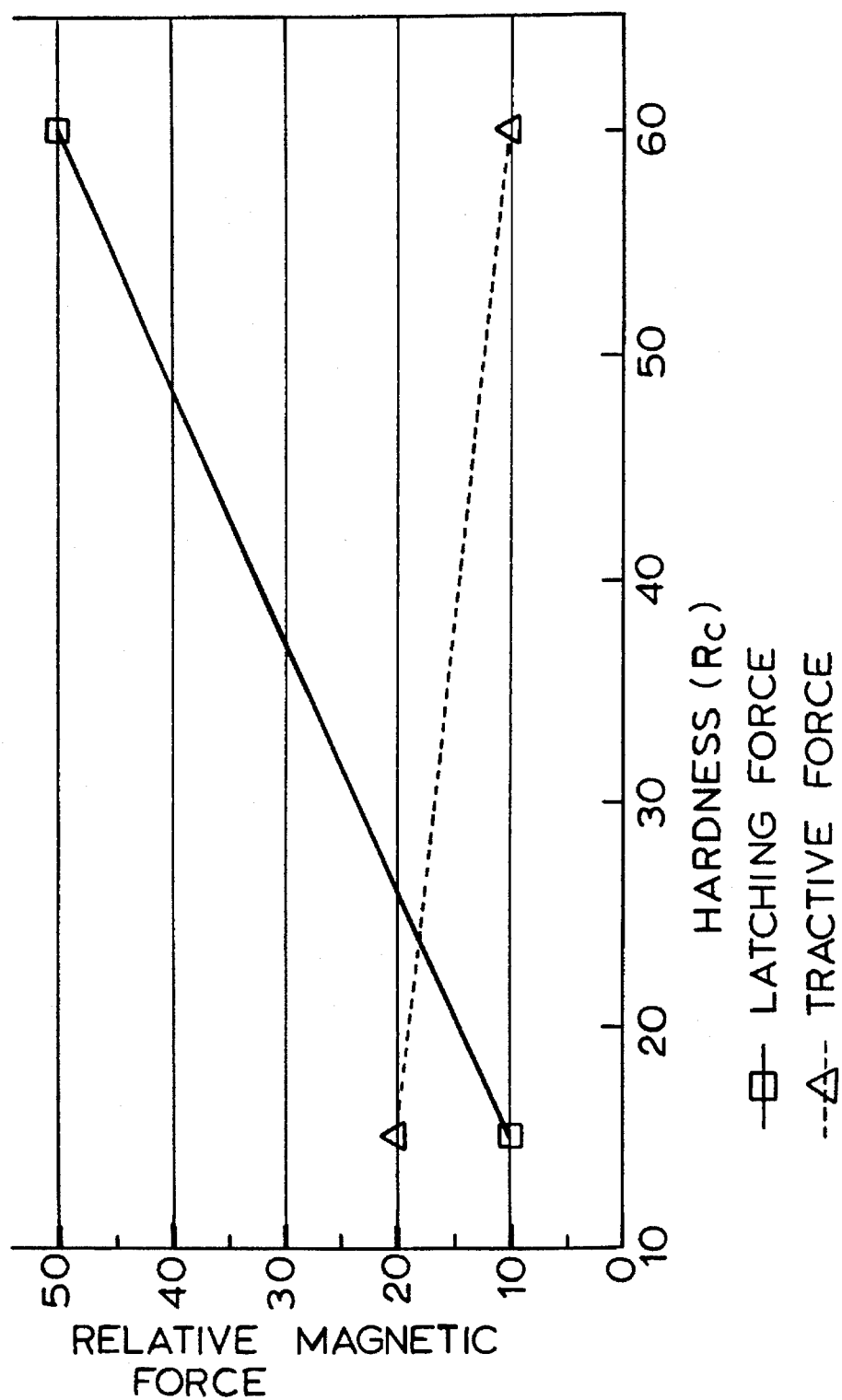
FIG. 4 is a graph illustrating the relationship between the relative solenoid latching and tractive forces and hardness for SAE 52100 steel.

FIG. 4 illustrates the general relationship between the RC hardness of SAE 52100 steel and the resultant latching and tractive forces, expressed as a relative percentage of magnetic force. It can be seen that the relative latching force (represented by the solid line) increases as the RC hardness of the steel increases. Although the relationship between RC hardness and latching force is generally illustrated in FIG. 4 to be linear, the graph in FIG. 4 is an approximation, and the relationship is not necessarily linear. The precise relationship between hardness and latching force for SAE 52100, as well as for other steels in accordance with the invention, can be empirically determined by preparing a number of samples of the preferred steel having incrementally different hardnesses and measuring the resultant latching force for each steel sample. The measured latching force for each steel sample can be graphically plotted as in FIG. 4.

FIG. 4 also illustrates the general relationship between the tractive force (represented by the dotted line) and the RC hardness of the SAE 52100 steel. The tractive force is the attractive force exerted upon the valve element armature due to energization of the wire coil(s). The precise relationship between the hardness and the relative tractive force can also be empirically determined for the preferred steels in a manner similar to that described above.

The armature and pole member(s) of the two embodiments described above may be manufactured in accordance with the following method. First, the desired latching force for the solenoid actuator is determined in a conventional manner based upon typical factors such as the surface area of the armature that will be in physical contact with the pole member and the number of amp-turns of the wire coil(s) used in the solenoid actuator.

After the desired latching force is determined, that latching force is obtained by determining what the corresponding hardness of the armature and pole member(s) should be, based on the known relationship between the hardness and the latching force, and heat treating the armature and pole member(s) to obtain that hardness.

For example, using the graph of the latching force illustrated in FIG. 4, if the desired latching force corresponds to a relative magnetic force of 45%, it can be seen that the corresponding RC hardness would be approximately 54. Therefore, to achieve the desired latching force, the armature and pole member(s) would be heat treated or otherwise hardened to achieve a final RC hardness of 54.

In the method of manufacturing the armature and pole member(s) of the solenoid actuator, those components are first formed out of steel using any conventional method, such as by machining them, and then they are subjected to a hardening process, such as heat treating, to achieve the desired hardness, and as a result, to achieve the desired latching force.

In the heat treating process, the armature and pole member(s) are initially hardened by raising their temperatures to a first relatively high temperature, such as 843° C. (1,550° F.), and then by cooling them in an agitated bath, such as an oil bath. As a result of this hardening step, the initial hardness of the armature and pole member(s) will be a relatively high value, such as an RC hardness of about 65.

After the hardening step, the armature and pole member(s) are subject to a tempering step. In this step, the temperature of the components is again raised to a second temperature, such as 200° C. (400° F.), lower than the first relatively high temperature employed in the initial hardening step. As is well known, the temperature to which the components are raised in the tempering step depends on the final hardness to be achieved. The components are then cooled, such as by air cooling them. As a result of the tempering step, the hardness of the armature and pole member(s) will be reduced to a lower value, such as an RC hardness of 59. The use of the two temperatures listed above (200° C. and 843° C.) will produce components with an RC hardness of about 59.

In the heat treating steps described above, all surfaces of the armature and pole member(s) are subject to the heat treatment and are thus hardened and tempered. Since the preferred steel from which the armature and pole member(s) are formed exhibit sufficient residual magnetism despite the fact that it is relatively hard, there is no need to selectively mask or cover one or more of the surfaces of the armature and/or pole members to prevent such surfaces from being hardened.

In the heat treating steps described above (and as is conventional practice), a relatively large number of armatures and pole members are preferably simultaneously heated and cooled together to maximize the energy efficiency of the process.

The detailed manner in which the solenoid components are heat treated, e.g. temperatures, time durations, methods of heating, methods of cooling, etc. is not important to the present invention. One with ordinary skill in the heat treatment art would know how to treat steel components to achieve any desired hardness. The heat treating process described above is not novel, per se, and has been previously used for various components other than armatures and pole members for solenoid actuators.

Industrial Applicability

The solenoid actuator and method of making the armature and pole members of the actuator as described above have numerous applications in industry, including general applications involving the utilization of solenoid actuators for valves and more specific applications such as the use of valve actuators in fuel injection systems. Such fuel injection systems could include, for example, hydraulically-actuated, electronically-controlled injector fuel systems or mechanically-actuated, electronically-controlled injector fuel systems.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

We claim:

1. A solenoid actuator having a pole member and an armature associated therewith, said solenoid actuator being latchable by residual magnetism between said pole member and said armature without the aid of a permanent magnet, said solenoid actuator comprising:

a pole member comprising steel having a carbon content of between about 0.8% and 1.2% and an RC hardness of between about 40 and 60;

an electrically energizable electromagnetic device associated with said pole member; and an armature associated with said pole member and comprising steel having a carbon content of between about 0.8% and 1.2% and an RC hardness of between about 40 and 60, said armature being reciprocable between a first position in which said armature makes physical contact with said pole member and a second position in which said armature is spaced from said pole member, said armature occupying said first position upon said electromagnetic device being electrically energized, said armature being held in said first position by residual magnetism between said pole member and said armature when said electromagnetic device is electrically deenergized after being initially electrically energized.

2. A solenoid actuator as defined in claim 1 wherein said armature comprises steel having a carbon content of about 1%.

3. A solenoid actuator as defined in claim 1 wherein said armature comprises SAE 52100 steel.

4. A solenoid actuator as defined in claim 1 wherein said Dole member comprises steel having a carbon content of about 1%.

5. A solenoid actuator as defined in claim 1 wherein said pole member comprises SAE 52100 steel.

6. A solenoid actuator as defined in claim 1 wherein said pole member and said armature comprise SAE 52100 steel.

7. A solenoid actuator as defined in claim 6 wherein said pole member is cylindrical in shape.

8. A solenoid actuator as defined in claim 7 wherein said pole member has an annular recess formed therein and wherein said electromagnetic device is disposed in said annular recess.

9. A solenoid actuator as defined in claim 7 wherein said armature is cylindrical in shape.

10. A solenoid actuator as defined in claim 9 wherein the diameter of said armature is substantially equal to the diameter of said pole member.

11. A solenoid actuator as defined in claim 9 additionally comprising a spring operatively coupled to said armature to bias said armature towards said second position.

12. A solenoid actuator having a pair of pole members and an armature associated therewith, said solenoid activator being latchable by residual magnetism between said pole members and said armature without the aid of a permanent magnet, said solenoid actuator comprising:

a first pole member comprising steel having a carbon content of between about 0.8% and 1.2% and an RC hardness of between about 40 and 60;

a first electrically energizable electromagnetic device associated with said first pole member;

a second pole member comprising steel having a carbon content of between about 0.8% and 1.2% and an RC hardness of between about 40 and 60;

a second electrically energizable electromagnetic device associated with said second pole member;

an armature associated with said first and second pole members and comprising steel having a carbon content of between about 0.8% and 1.2% and an RC hardness of between about 40 and 60, said armature being reciprocable between a first position in which said armature makes physical contact with said first pole member and a second position in which said armature makes physical contact with said second pole member, said armature occupying said first position upon said first electromagnetic device being electrically energized and said second position upon said second electromagnetic device being electrically energized, said armature being held in said first position by residual magnetism between said first pole member and said armature when said first electromagnetic device is electrically deenergized after being initially electrically energized, and said armature being held in said second position by residual magnetism between said second pole member and said armature when said second electromagnetic device is electrically deenergized after being initially electrically energized.

13. A solenoid actuator as defined in claim 12 wherein said armature comprises steel having a carbon content of about 1%.

14. A solenoid actuator as defined in claim 12 wherein said armature comprises SAE 52100 steel.

15. A solenoid actuator as defined in claim 12 wherein said first and second pole members comprise steel having a carbon content of about 1%.

16. A solenoid actuator as defined in claim 12 wherein said first and second pole members comprise SAE 52100 steel.

17. A solenoid actuator as defined in claim 12 wherein said first and second pole members and said armature comprise steel having a carbon content of about 1%.

18. A solenoid actuator as defined in claim 12 wherein said first and second pole members and said armature comprise SAE 52100 steel.

19. A solenoid actuator as defined in claim 12 wherein said first and second pole members are cylindrical in shape.

20. A solenoid actuator as defined in claim 19 wherein each of said first and second pole members has an annular recess formed therein, wherein said first electromagnetic device is disposed in said annular recess formed in said first pole member, and wherein said second electromagnetic device is disposed in said annular recess formed in said second pole member.

21. A solenoid actuator as defined in claim 20 wherein said armature is cylindrical in shape.

22. A solenoid actuator as defined in claim 21 wherein said first and second pole members have substantially the same diameter and wherein the diameter of said armature is substantially equal to the diameter of said pole members.

\* \* \* \* \*